United States Patent
Erfling et al.

(10) Patent No.: US 7,671,999 B2
(45) Date of Patent: Mar. 2, 2010

(54) DEVICE FOR MEASURING PARTS BY TRIANGULATION SENSORS AND AN EVALUATION UNIT FOR DETERMINING

(75) Inventors: Cordt Erfling, Paderborn (DE); Rainer Lüebbers, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 26 days.

(21) Appl. No.: 11/793,278

(22) PCT Filed: Oct. 21, 2005

(86) PCT No.: PCT/DE2005/001892

§ 371 (c)(1),
(2), (4) Date: Mar. 17, 2008

(87) PCT Pub. No.: WO2006/063543

PCT Pub. Date: Jun. 22, 2006

(65) Prior Publication Data

US 2009/0015846 A1     Jan. 15, 2009

(30) Foreign Application Priority Data

Dec. 16, 2004  (DE) .................. 10 2004 061 177
Sep. 8, 2005   (DE) .................. 10 2005 042 902

(51) Int. Cl.
*G01B 11/24* (2006.01)

(52) U.S. Cl. .................. 356/602; 356/601

(58) Field of Classification Search ......... 356/625–640, 356/601–613, 5.01–5.04, 4.01; 382/154, 382/141, 106, 199, 203, 285, 286, 149, 151, 382/108, 254; 348/125–130, 86–87, 94–95; 345/419; 250/559.22–559.33

See application file for complete search history.

(56) References Cited

U.S. PATENT DOCUMENTS

| | | | |
|---|---|---|---|
| 5,028,799 | A | 7/1991 | Chen et al. |
| 6,064,759 | A | 5/2000 | Buckley et al. |
| 6,480,287 | B2 | 11/2002 | Lee et al. |
| 2002/0024677 | A1 | 2/2002 | Metcalfe et al. |
| 2005/0046871 | A1* | 3/2005 | Martinschledde et al. ... 356/601 |
| 2006/0232787 | A1 | 10/2006 | Hoffmann et al. |

FOREIGN PATENT DOCUMENTS

| | | |
|---|---|---|
| DE | 3817321 A1 | 5/1989 |
| DE | 40 25 682 A1 | 2/1992 |
| DE | 40 26 206 A1 | 2/1992 |
| DE | 100 62 251 A1 | 7/2002 |
| DE | 103 13 191 A1 | 10/2004 |
| EP | 0 540 343 A | 5/1993 |

* cited by examiner

*Primary Examiner*—Gregory J Toatley, Jr.
*Assistant Examiner*—Tri T Ton
(74) *Attorney, Agent, or Firm*—Birch, Stewart, Kolasch & Birch, LLP

(57) ABSTRACT

A device for measuring components by a laser triangulation measuring device includes at least two triangulation sensors for determining the height profiles of components. The component is arranged on a movable support plane in a horizontal moving direction relative to the laser triangulation measuring device, whereby at least two triangulation sensors are arranged in a mutual measuring plane forming a positional offset, for determining the height profile and a cross-sectional profile of the component in the measuring plane.

25 Claims, 3 Drawing Sheets

DEVICE FOR MEASURING PARTS BY TRIANGULATION SENSORS AND AN EVALUATION UNIT FOR DETERMINING

CROSS-REFERENCE TO RELATED APPLICATION

The present application claims priority under 35 U.S.C. §119 to German Patent Application No. 10 2004 061 177.7 filed Dec. 16, 2004, German Patent Application No. 10 2005 042 902.5 filed Sep. 8, 2005, and International Application PCT/DE 2005/001892 filed Oct. 21, 2005, the entire contents of which are hereby incorporated by reference.

BACKGROUND OF THE INVENTION

1. Field of the Invention

The invention relates to a device for measuring components by using a laser triangulation measuring device comprising at least one triangulation sensor for determining height profiles of the component, whereby the component is arranged on a support plane that is movable in a horizontal moving direction relative to the laser triangulation measuring device.

Furthermore, the invention relates to an evaluation unit for an aforementioned device for measuring components.

2. Description of Background Art

From DE 100 62 251 C2, a device for measuring components is known, wherein a height profile of a component is determined by a laser triangulation measuring device. The known device is limited to the determination of height representations of a level, that is, a curved surface of the component.

From DE 40 25 682 C2, a device for measuring components is known, whereby the height profile of strand-shaped components is measured by a laser triangulation measuring device. The laser triangulation measuring device is comprised of a single triangulation sensor, which is oriented to one sole surface of the strand-shaped component and allows a measuring of the component, which is movable in a horizontal direction relative to the laser triangulation measuring device, in a vertical and horizontal direction. The laser triangulation measuring device is relatively costly and is limited to the measuring of the component from one side.

SUMMARY AND OBJECTS OF THE INVENTION

It is the object of the present invention to further develop a device for measuring components, that is, an evaluation unit for said device such that with minimal expenditure, a touch-free measuring of three-dimensional geometries of components is provided.

To meet this objective, the invention is characterized in that at least two triangulation sensors are arranged in at least one mutual measuring plane forming a positional offset for determining the height profile and a cross-sectional profile of the component in the measuring plane.

The particular benefit of the device of the invention is such that it allows a geometric inspection, that is, a three-dimensional inspection of the component, which makes a complete inspection of the component's contour possible. According to the invention, at least two triangulation sensors are arranged in a mutual measuring plane forming a positional offset so that the detection unit thus formed creates a laser measuring curtain, so to speak, through which the component resting on the support plane is relatively moved.

As a result of the spatial offset arrangement of the triangulation sensors, which by themselves only allow a measuring of the distance and/or the measuring of a height profile within a limited spatially defined range, an expansion of the measuring area to any desired range is possible. In combination with the relative movement between the component and the triangulation sensor, a three-dimensional determination of the component's profile can thus be achieved in a simple way. It is beneficial for the triangulation sensors to be arranged relative to one another, and/or the number of triangulation sensors to be determined such that a plurality of different geometries of the component can be registered. Beneficially, the triangulation sensors are arranged in a plurality of measuring planes, in which they are arranged in a row transversely to the moving direction, each having the same spatial orientation to the component. Preferably, the measuring planes are arranged in a staggered manner in the moving direction of the component.

In a further embodiment of the invention, the triangulation sensors are arranged in a positional offset to one another such that optical axes of various planes of triangulation sensors form an acute angle to one another. It is thus ensured that the entire geometry of the component is registered from a three-dimensional angle.

In a further embodiment of the invention, the support plane of the component is designed such that it can be moved by a precision guide device in order to achieve the relative movement between triangulation sensors and component.

To meet the objective, the evaluation unit according to the invention is characterized in that the nominal data of the component are on hand as an electronically generated three-dimensional reference model, which during comparison are brought into conformance with the actual model represented by the actual data by alignment with a reference point and/or a reference edge.

It is the particular benefit of the evaluation unit of the present invention that a three-dimensional configuration adjustment between a calculated reference model and a detected actual model is possible without requiring an adjustment of the component to be detected. An automatic or manual evaluation of the component's geometry is done by a calculating unit, preferably by a computer, in which the nominal data of the reference model are stored.

In a further embodiment of the evaluation unit, an inspection program is provided to make the inspection of pre-selectable geometric properties of the actual model possible. Beneficially, a selective geometric inspection of components can be done in this way, preferably of exclusively, for example, checking the spacing of bores, bore diameters, radii, contour accuracy, or other geometric properties.

In a further embodiment of the evaluation unit, the evaluation data thus obtained are stored in a memory so that traceability of the component with regard to its geometric properties and its place of manufacture is available.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Exemplary embodiments of the invention are described in more detail therebelow with reference to the drawings, wherein.

DETAILED DESCRIPTION OF THE PREFERRED EMBODIMENTS

Figure 1:
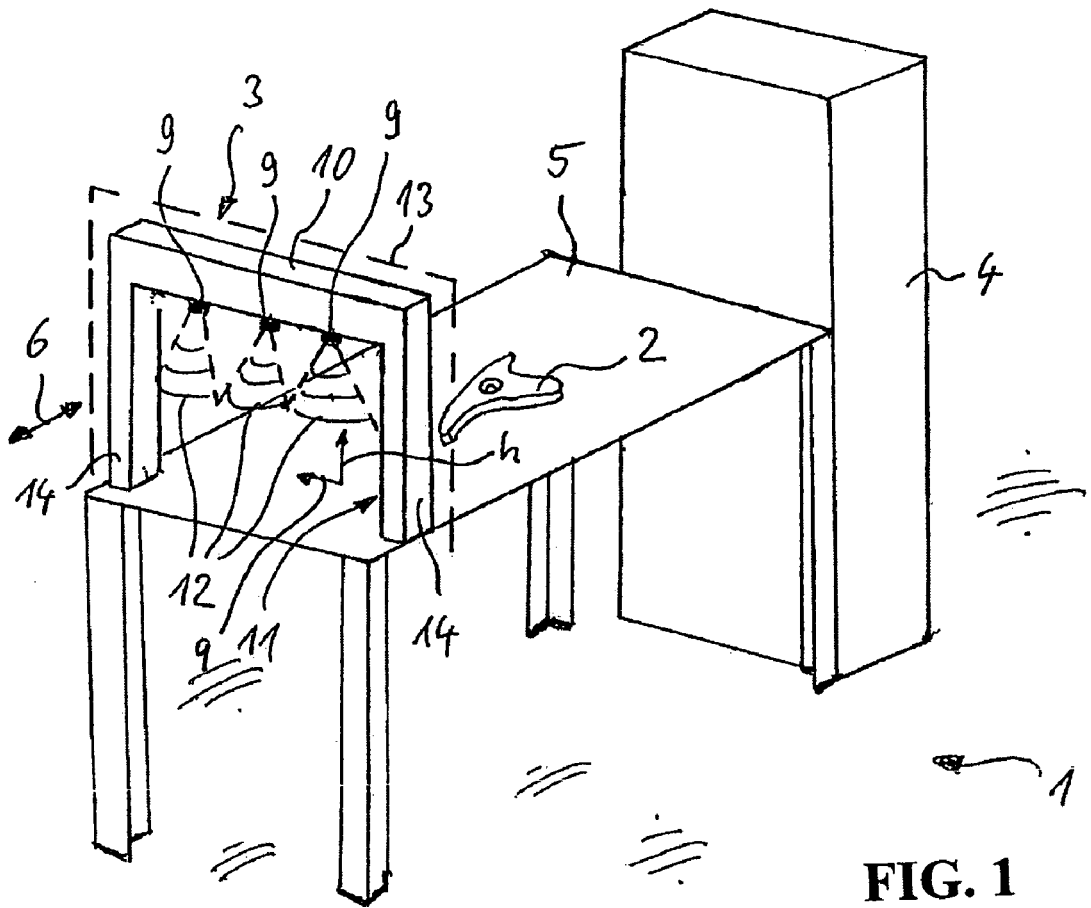
FIG. 1 shows a perspective illustration of a device of the invention according to a first embodiment for measuring components.

The device 1 of the present invention for measuring components 2 is utilized in the manufacture of components 2 and is used to inspect the geometry of manufactured component 2.

Essentially, the device 1 of the present invention is comprised of a laser triangulation measuring device 3, an evaluation unit 4, and a support plane 5, on which the component 2 to be measured is positioned.

The support plane 5 for component 2 is designed as a support table, which is fixedly mounted and vibration-cushioned. The dimensions of the support table are 1.5 meters×0.6 meters, for example.

The laser triangulation measuring device 3 is arranged in a horizontal moving direction 6 relatively movable to support table 5. The laser triangulation measuring device 3 can thereby have a designated drive (not illustrated).

In a first embodiment of the invention according to FIG. 1, the laser triangulation measuring device 3 has three triangulation sensors 9 arranged at even intervals, which are mounted transversely to the moving direction 6 on a horizontal cross beam 10 of a movable carrier 11. The triangulation sensors 9 are attached to the bottom side of the cross beam 10, and with their respective laser bundles 12, cover a vertical measuring plane 13, which extends vertically to the horizontal moving direction 6 and vertically to the support table 5.

The height of the cross beam 10 is determined by the length of legs 14 of the carrier 11 extending in a vertical direction, which extend between the ends of cross beam 10 and the support table 5, respectively. The height of the legs 14 can be 0.2 meters, for example. Thus, the carrier 11 forms a movable bridge, that is, in combination with the triangulation sensors 9, a movable optical curtain, through which component 2 is relatively moved in a horizontal moving direction 6. The component 2 can have any desired position on the support table 5. Due to the arrangement of the triangulation sensors 9, both the height profile in a direction h and the cross-sectional profile in a direction q are determined in the vertical measuring plane 13. Thus, a complete contour measuring of component 2 is done from a two-dimensional angle, whereby a complete three-dimensional profile measuring of component 2 is rendered possible by moving the carrier 11 continuously or in short-time intervals while the component 2 is completely registered by the triangulation sensors 9.

In the evaluation unit 4, the actual data of measured component 2 provided by the laser triangulation measuring device 3 are compared to the nominal data of component 2 stored in the evaluation unit. The nominal data of component 2 represent a reference model of component 2, which is available three-dimensionally in electronic form generated by CAD technology, for example. The reference model can have designated reference geometries (bores, cylinders, edges, contour shapes), by which the registered actual data can be aligned with the reference model. A second method for aligning the models with one another is the application of a best fit calculation. In this way, the measuring of the component 2 can be done in an operator-friendly manner regardless of the position of the component 2 on the support plane 5. The evaluation program of the evaluation unit 4 renders possible the automatic alignment of the actual model with the reference model by aligning the distinctive reference points of the reference model with a corresponding distinctive point of the actual model.

The evaluation unit comprises an inspection program, which is used to check the conformance of pre-selectable geometric properties of the actual model with the reference model. In particular, this makes it possible to examine fabrication-relevant (subject to tolerances) properties of component 2, for example. This geometric examination can include the spacing of bores, and/or the diameter of the bore, and/or certain radii, and/or the contour accuracy of component 2, for example.

In the evaluation unit 4, the deviations of the actual model from the reference model are calculated and are communicated to an operator in a conventional way by a monitor, that is, a printout. This visualization particularly includes the crossing of a defined error threshold, which can result in the modified adjustment of the corresponding manufacturing apparatus.

Furthermore, the evaluation unit 4 comprises a memory, wherein the evaluation data acquired therein is stored. Thus, traceability of component 2 with respect to place and date of production is ensured.

Figure 2:
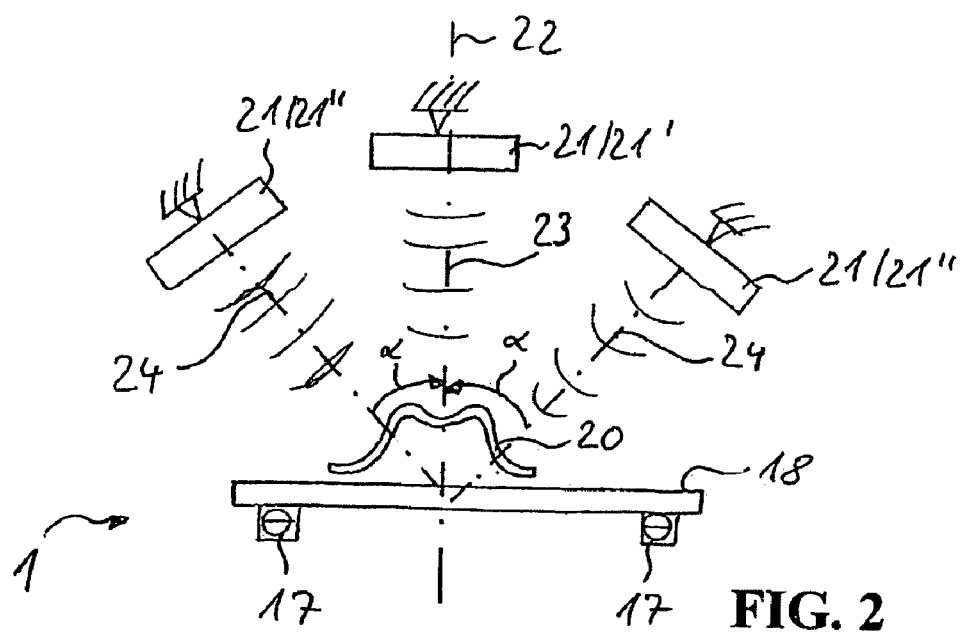
FIG. 2 shows a vertical cross section of the device of the invention according to a second embodiment in the area of the measuring plane.

In a second embodiment of device 1 according to FIG. 2, a component 20 is positioned on a movable support table 18. The support table 18 bearing component 20 is moved in a horizontal moving direction 6 by a drive, whereby the support table 18 is guided by a precision guide device 17. The support table 18 can also be a conveyor belt, for example.

The triangulation measuring device 3 sketched in FIG. 2 is comprised of at least three triangulation sensors 21, which are arranged at a positional offset to one another, both with respect to height h and in their orientation to component 20. A central triangulation sensor 21' is arranged in the area of a transverse center plane 22 of support table 18 above said support table. An optical axis 23 of the center triangulation sensor 21' extends vertically to the support table 18 in the vertical measuring plane 13. Optical axes 24 of outer triangulation sensors 21", which are respectively arranged on both sides of the central triangulation sensor 21', respectively extend in an acute angle to the optical axis 23 of the central triangulation sensor 21'. The central triangulation sensor 21" is arranged in a height offset to the outer triangulation sensors 21".

Due to the outer triangulation sensors 21" being arranged in the acute angle α, it is ensured that apart from the determination of the height profile, a determination of the cross-sectional profile of component 20 is also provided.

It goes without saying that the triangulation sensors 9, 21", 21', 21" are also arranged at an offset to one another in a horizontal moving direction 6. In this case, the vertical measuring plane 13 is of a certain "thickness."

Component 2, 20 can also be a sheet metal component, for example. The measuring precision of the laser triangulation measuring device 3, that is, its resolution can be smaller than 0.2 mm. The measuring process can be accomplished within one minute, although the time for taking a reading can be prolonged due to an additional measuring process when undercuts of component 2 occur.

The reference model, that is, the inspection programs can be centrally stored in a data server, which is interconnected with the evaluation unit 4 located elsewhere.

Figure 3:
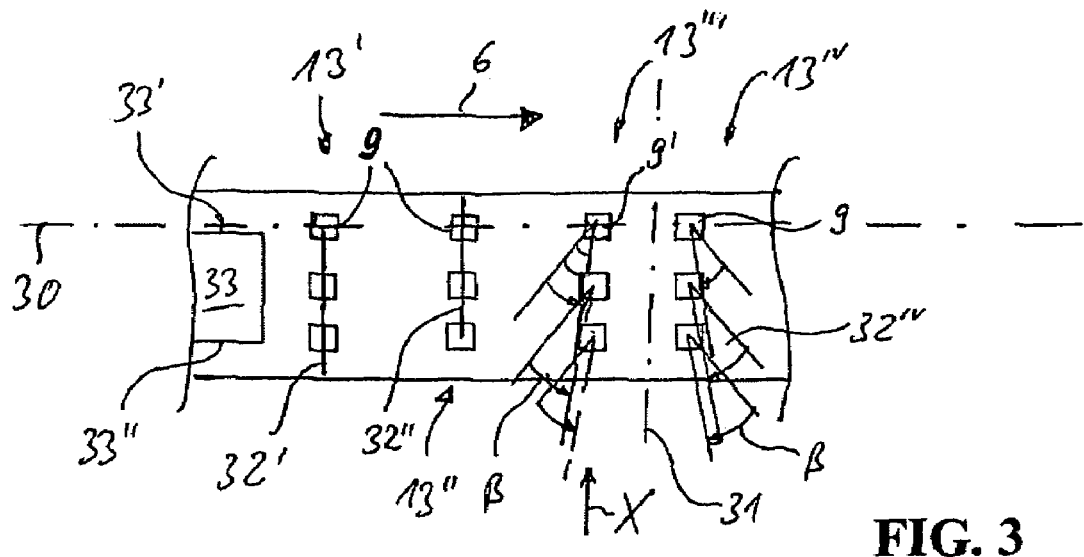
FIG. 3 is a top view of the device of the invention in accordance with a third embodiment.
Figure 4:
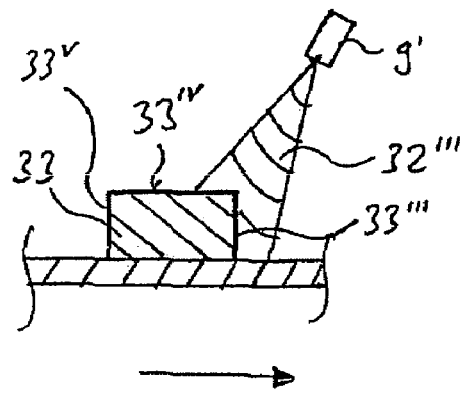
FIG. 4 is a side view of the device according to FIG. 3 in a direction X.

In an exemplary embodiment of the invention illustrated in FIGS. 3 and 4, a plurality of measuring planes 13, each having a plurality of triangulation sensors 9 arranged in a row, are arranged successively in the horizontal moving direction 6. The spatial orientation/angular configuration with respect to component 33, that is, a vertical plane 30, 31, of each triangulation sensor 9 of a measuring plane 13 is identical. For example, the triangulation sensors 9 in a first measuring plane 13' can each form a first acute angle to a vertical plane 30, whereby the vertical plane 30 extends parallel to moving direction 6. This acute angle thereby extends in a vertical plane, whereby the optical axes of the sensors are oriented transversely to the moving direction 6 to the right. This results in a detecting range, that is, scanning range 32, which in particular registers a cross-sectional profile 33' of a component 33 to be measured extending in moving direction 6.

The triangulation sensors 9 located in the moving direction 6 consecutive second measuring plane 13", are, like the aforementioned sensors, oriented around an acute angle to the vertical plane 30, which extends parallel to the moving direction 6. In contrast to the measuring plane 13', the optical axes of the triangulation sensors 9 of the second measuring plane 13" are oriented to the left of the vertical plane 30 with respect to the moving direction 6 so that a detecting range/scanning range 32" is provided, which in particular registers the right side of a cross-sectional profile 33" extending in the moving direction 6. Preferably, the triangulation sensors 9 of the second measuring plane 13" on the vertical plane 30 and the triangulation sensors 9 of the first measuring plane 13' are arranged with mirror symmetry.

In a third and fourth measuring plane 13''' and $13^{IV}$, the triangulation sensors 9, 9' are arranged in an acute angle β to a vertical plane 31, which extends vertically to the moving direction 6. In the third measuring plane 13''', the optical axes of the triangulation sensors 9' are oriented, that is, lined up in an opposite direction to the moving direction 6 corresponding to a defined angle β, for example, 30°, to achieve a detecting range/scanning range 32''' that is oriented in an opposite direction to the moving direction 6. In particular, apart from an upper height profile $33^{IV}$, a front cross-sectional profile 33''' of component 33 is thus registered. Thus, not only vertical flanks of component 33 in the direction of the moving direction 6 can be registered, but also steep edges extending transversely to the moving direction 6.

With the sensors 9 of the fourth measuring plane $13^{IV}$, which relative to the vertical plane 31 are arranged in mirror symmetry with the triangulation sensors 9' of the third measuring plane 13''', a detecting range $32^{IV}$ can be created, which in particular registers a rear transverse profile $33^V$ of component 33.

With triangulation sensors 9, 9' suitably oriented in measuring planes 13', 13", 13''', $13^{IV}$, a complete geometry of component 33 can be registered. The device of the invention has a relatively narrow width, without extending beyond the longitudinal sides of support plane 5.

Alternatively, a further measuring plane (not illustrated) in addition to measuring planes 13', 13", 13''', $13^{IV}$ can be provided, the optical axes of which point downwards in a vertical direction. Thus, relatively deep "dales" of component 33 can be registered, which cannot be detected by the obliquely mounted triangulation sensors 9 of measuring plane 13', 13", 13''', $13^{IV}$ due to shading effects.

In the described exemplary embodiments, the triangulation sensors 9 designated to a respective measuring plane 13', 13", 13''', $13^{IV}$ are arranged at a positional offset transversely to the moving direction 6. The triangulation sensors 9 of different measuring planes 13', 13", 13''', $13^{IV}$ are positionally offset alongside the moving direction 6.

Alternatively, the triangulation sensors 9 of a measuring plane 13', 13", 13''', $13^{IV}$ can also be oriented differently with respect to the vertical plane 30 and/or the vertical plane 31.

In an embodiment of the invention, the triangulation sensors of a measuring plane function in different wavelength ranges, whereby a registration, that is, calculation of the component is carried out in several individual coordinate systems, which are dedicated to the respective triangulation sensors. The number of triangulation sensors depends on the size and geometry of the component. For example, a first triangulation sensor of the first measuring plane can operate in a wavelength range of 620 nm, a second sensor in the same measuring plane in the wavelength range of 640 nm, and a third sensor in the same measuring plane in the range of 660 nm. The image data (actual data) registered by the respective sensors are gathered in a mutual cumulative coordinate system of the evaluation unit and are then compared with the nominal data of a CAD model or with a reference model of the component, which was previously registered by the triangulation sensors. Thus, an undesired mutual interference with the measuring result in a measuring plane due to the overlapping of the areas of the component registered by the individual sensors is beneficially avoided.

By attaching suitable color filters of the triangulation sensors, this effect can be improved.

As an alternative, the triangulation sensors can be utilized based on structured light or on a photogrammetic basis. Alternatively, the triangulation sensors can also be provided with 3D cameras, which are used to evaluate flash durations.

In an alternative embodiment of the invention, it can be provided to guide the component through the measuring device, that is, through the measuring planes several times. In the evaluation unit, the registered data are then combined in an overall model.

Preferably, the arrangement of the triangulation sensors is calibrated, with a fixed relative position to one another.

Figure 5:
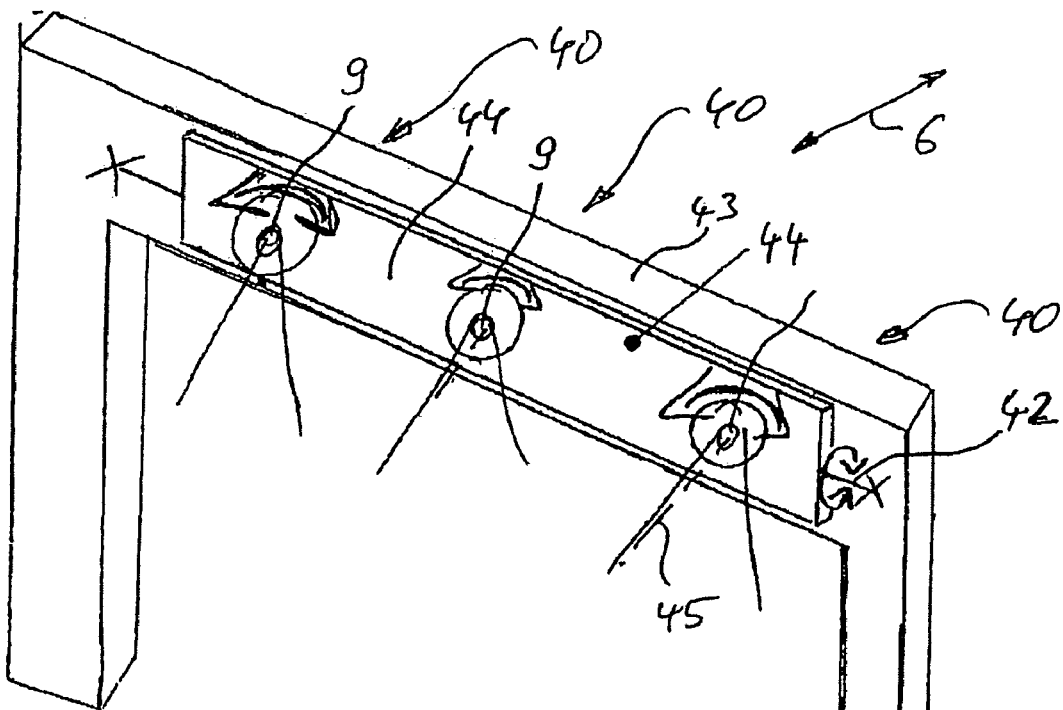
FIG. 5 is a perspective illustration of a device of the invention in accordance with a fourth embodiment.
Figure 6:
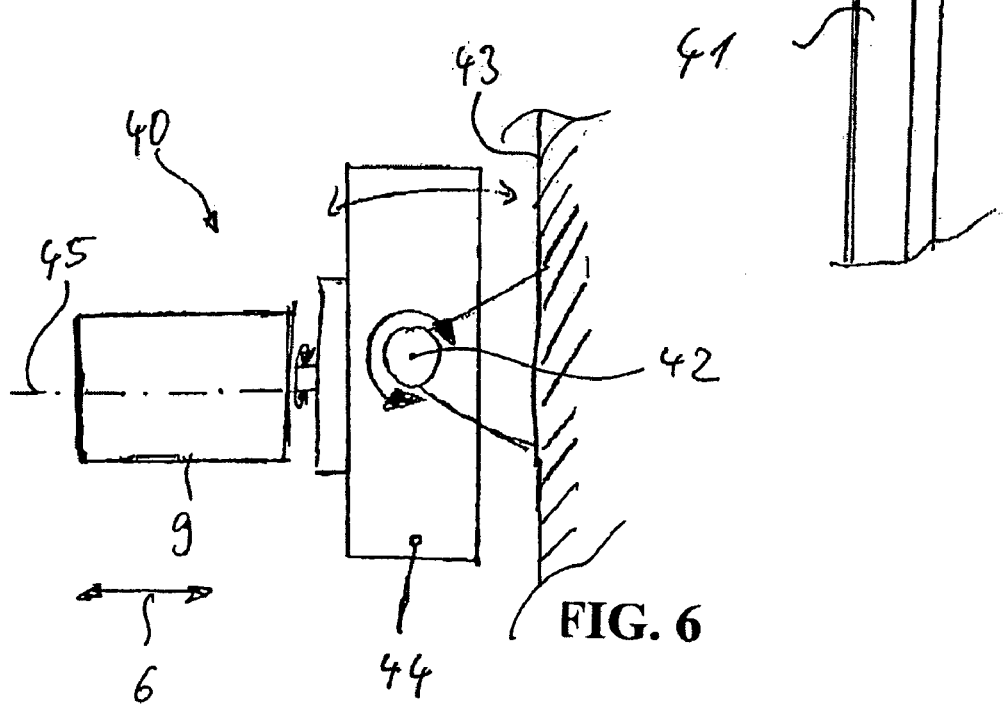
FIG. 6 is a side view of the device according to FIG. 5.

In a further embodiment of the invention according to FIGS. 5 and 6, a carrier 41 that is movable in the moving direction 6 is provided, which apart from upright posts is provided with a crossbar 43 connecting the upper ends of the posts. On a vertically extending wall of the crossbar 43, a carrier disk 44 provided with three triangulation sensors 9 is arranged, which is pivotably positioned around a longitudinal axis 42 of crossbar 43. For each of the three sensors 9, an adjustment device 40 is provided with a stepping motor (not illustrated) as adjusting means, for example, by which the triangulation sensors 9 are automatically aligned synchronously in dependence from existing actual data derived from a reference model of component 2. Thus, the orientation of the triangulation sensors 9 towards component 2 can be fixedly adjusted based on the nominal data so that the actual geometry of the height and cross-sectional profiles of component 2 can be optimally registered.

Additionally, the adjustment device 40 can have adjusting means so that the triangulation sensors 9 are pivotably positioned around an axis of rotation 45, whereby the axis of rotation 45 extends vertically to the longitudinal axis 42 of crossbar 43. Preferably, the rotational axis 45 extends in a horizontal direction. In this way, an improved orientation of the triangulation sensors 9 onto component 2 can be achieved. As an adjusting means, a stepping motor can be designated to the respective sensors 9, whereby the sensors 9 are turned discretely, preferably with equidistant motion.

In an alternative embodiment, the adjusting means for the carrier disk 44 and the individual sensors 9 can be designed such that the carrier disk 44, that is, the sensors 9 are continuously adjusted around the longitudinal axis 42 and/or the rotational axis 45. For this purpose, servomotors can be employed.

In a variation of the device of the present invention, the position of component 2 can be determined by a first overview scanning run, whereby the triangulation sensors 9 are in a home position. In a second step, a second primary scanning run takes place, whereby an automatic alignment of the triangulation sensors 9 with component 2 occurs by adjusting to the nominal data of the reference model for determining the actual data of component 2. The orientation of the triangulation sensors 9 is thereby dynamically adjusted to the nominal data. The registration of the height and cross-sectional profiles of component 2 can thereby be further optimized.

In an alternative variation of the device, the adjustment device 40 can also be provided with adjusting means so that in a first overview scanning run, merely the position and the dimension of component 2 with no regard to the nominal data can be determined. In the second primary scanning run, the measuring point data (actual data) of component 2 is registered with the triangulation sensors 9 in a fixed arrangement or in motion.

Beneficially, the embodiment of the device according to FIGS. 5 and 6 renders an improved and in particular, a faster scanning of component 2 possible. Preferably, the triangulation sensors 9 can be designed as video sensors in order to register the position and orientation of component 2 in a relatively short period of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A device for measuring a component, comprising:
   a laser triangulation measuring device, having three triangulation sensors, at least one of which is adapted to determine a height profile of the component; and
   a support plane on which the component is arranged, the support plane being movable in a moving direction that is horizontal relative to the laser triangulation measuring device,
   wherein the at least two triangulation sensors are arranged in at least one mutual measuring plane and form a positional offset for determining the height profile and a cross-sectional profile of the component in the measuring plane,
   wherein an adjustment device is provided such that each of the three triangulation sensors is positioned to be movable individually and to be movable synchronously relative to a carrier of the three triangulation sensors, and
   wherein the adjustment device is provided with a carrier disk that is pivotably positioned on a crossbar around a longitudinal axis of the crossbar of the carrier, on which the three triangulation sensors are fixedly arranged, and are pivotably arranged on an axis of rotation extending in an orthogonal direction to a longitudinal axis of the crossbar.

2. The device according to claim 1, wherein the three triangulation sensors are arranged in a row in a first one of mutual measuring planes, transversely to a horizontal moving direction, and
   wherein the three triangulation sensors arranged in the row transversely to the horizontal moving direction are arranged at the positional offset relative to one another in a direction of the horizontal moving direction.

3. The device according to claim 1, wherein the three triangulation sensors are arranged in a row in one of the at least one measuring planes, and
   wherein a first one of the triangulation sensors is arranged in a first one of the measuring planes, and others of the triangulation sensors are arranged in an adjacent one of the measuring planes and are arranged at fixed or changeable acute angles (α) relative to the first one of the triangulation sensors.

4. The device according to claim 3, wherein the three triangulation sensors include a central triangulation sensor arranged in an area of a transverse midplane of the support plane above said support plane, whereby optical axes of the three triangulation sensors extend vertically or in a changed orientation relative to the support plane.

5. The device according to claim 3, wherein the three triangulation sensors include a central triangulation sensor and an outer triangulation sensor on each side of and adjacent to the central triangulation sensor,
   the optical axis of each of the outer triangulation sensors, together with an optical axis of the central triangulation sensor, cover the at least one mutual measuring plane, and
   each of the outer triangulation sensors, respectively extends in a changeable acute angle (α) relative to the optical axis of the central triangulation sensor.

6. The device according to claim 3, wherein the three triangulation sensors include a central triangulation sensor arranged at an offset in an upward vertical direction, and which is changeable with respect to outer triangulation sensors on each side of and adjacent to the central triangulation sensor.

7. The device according to claim 1, wherein the support plane is adapted to be redirected and positioned by a precision guide device.

8. The device according to claim 1, wherein the three triangulation sensors are mounted to a mutual stationary carrier.

9. The device according to claim 1, wherein the adjustment device has adjusting means such that the three triangulation sensors are continuously oriented to the component.

10. The device according to claim 1, wherein the adjustment device has adjusting means such that the three triangulation sensors, independently of available nominal data of the component derived from a reference model of the component, are self-orienting.

11. A device for measuring a component, comprising:
    a laser triangulation measuring device, having three triangulation sensors, at least one of which is adapted to determine a height profile of the component; and
    a support plane on which the component is arranged, the support plane being movable in a moving direction that is horizontal relative to the laser triangulation measuring device,
    wherein the three triangulation sensors are arranged in at least one mutual measuring plane and form a positional offset for determining the height profile and a cross-sectional profile of the component in the measuring plane,
    wherein an adjustment device is provided such that each of the three triangulation sensors is positioned to be movable individually and to be movable synchronously relative to a carrier of the three triangulation sensors, wherein the adjustment device has adjusting means such that a position of the component is detected by a first overview scanning run of the triangulation sensors being in a fixed home position, and wherein in a second primary scanning run, the triangulation sensors are then oriented automatically to the component while adjusting to nominal data of the component to detect actual data of the component.

12. The device according to claim 11, wherein the adjustment device has adjusting means such that in the first overview scanning run, merely the position and dimensions of the component, with no regard to its nominal data, are registered, and wherein in the second primary scanning run, actual data of the component are registered, with the three triangulation sensors being fixedly arranged.

13. The device according to claim 1, wherein a carrier and a crossbar are movably positioned in a horizontal moving direction.

14. The device according to claim 1, wherein the three triangulation sensors are video sensors.

15. An evaluation unit for a device for measuring components according to claim 1, whereby nominal data of the component are compared with actual data of the component, wherein the nominal data of the component are available as an electronically generated three-dimensional reference model, which, by alignment with reference points, are brought into conformance with an actual model represented by the actual data during comparison.

16. The evaluation unit according to claim 15, wherein the evaluation unit includes an inspection program, with which pre-selectable geometric properties of the actual model of the component are automatically inspected.

17. The evaluation unit according to claim 15, wherein the evaluation unit has a memory for saving evaluation data.

18. The device according to claim 1, wherein the three triangulation sensors are arranged in a row in a first one of mutual measuring planes, transversely to a horizontal moving direction, or wherein the three triangulation sensors arranged in the row transversely to the horizontal moving direction are arranged at the positional offset relative to one another in a direction of the horizontal moving direction.

19. The device according to claim 1, wherein the three triangulation sensors are arranged in a row in one of the at least one measuring planes, or wherein a first one of the triangulation sensors is arranged in a first one of the measuring planes, and others of the triangulation sensors are arranged in an adjacent one of the measuring planes and are arranged fixed or changeable acute angles ($\alpha$) relative to the first one of the triangulation sensors.

20. The device according to claim 1, wherein an adjustment device is provided such that each of the three triangulation sensors is positioned to be movable individually or to be movable synchronously relative to a carrier of the three triangulation sensors.

21. The device according to claim 1, wherein the adjustment device has adjusting means such that the three triangulation sensors are oriented to the component discretely at identical intervals.

22. The device according to claim 11, wherein the adjustment device has adjusting means such that in the first overview scanning run, merely the position and dimensions of the component, with no regard to its nominal data, are registered, and wherein in the second primary scanning run, actual data of the component are registered, with the three triangulation sensors being in motion.

23. The device according to claim 1, wherein a carrier or a crossbar are movably positioned in a horizontal moving direction.

24. The device according to claim 5, wherein the at least one mutually measuring plane is vertical.

25. The device according to claim 1, wherein the adjustment device is provided with a carrier disk that is pivotably positioned on a crossbar around a longitudinal axis of the crossbar of the carrier, on which the three triangulation sensors are fixedly arranged, or are pivotably arranged on an axis of rotation extending in an orthogonal direction to a longitudinal axis of the crossbar.

* * * * *